(12) United States Patent  (10) Patent No.: US 7,769,365 B2
Richardson et al.  (45) Date of Patent: Aug. 3, 2010

(54) METHODS AND INTERFACES FOR TELEPHONE BOOK INDEXING

(75) Inventors: Roger D. Richardson, Mundelein, IL (US); Chad L. Biederman, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 1133 days.

(21) Appl. No.: 11/412,605

(22) Filed: Apr. 27, 2006

(65) Prior Publication Data
US 2007/0264980 A1  Nov. 15, 2007

(51) Int. Cl.
*H04M 3/42* (2006.01)
(52) U.S. Cl. .............. 455/415; 455/418; 455/550.1; 455/556.2; 455/566
(58) Field of Classification Search .......... 455/566, 455/418, 186.2, 415, 550.1, 556.2; 707/3, 707/4; 715/787
See application file for complete search history.

(56) References Cited

U.S. PATENT DOCUMENTS

| 6,697,483 | B1 * | 2/2004 | Saarinen et al. ............ 379/354 |
| 2003/0128192 | A1 * | 7/2003 | van Os ..................... 345/173 |
| 2003/0195018 | A1 * | 10/2003 | Lee ........................ 455/566 |
| 2005/0143135 | A1 * | 6/2005 | Brems et al. .............. 455/564 |
| 2005/0246650 | A1 | 11/2005 | Yeung et al. |

* cited by examiner

*Primary Examiner*—Kamran Afshar
*Assistant Examiner*—Chuong A Ngo

(57) ABSTRACT

Disclosed are methods and telephone book interfaces for a navigable telephone book of a mobile communication device. A method includes storing telephone book entries of the navigable telephone book of the mobile communication device, a subset of the telephone book entries being conforming names. The telephone book entries include conforming names to form a retrieved list of conforming names so that they may be accessed by at least one of a fine scrolling control and a coarse scrolling control. A truncated list of conforming names is displayed on the display screen so that a plurality of telephone book entries of the same name are undivided on a display screen, if the retrieved list of conforming names would otherwise span more than one page length of the display. Names are consolidated on the display screen if the consolidated list of conforming names fills at least one page length of the display.

19 Claims, 6 Drawing Sheets

RULE #2 Name Consolidation for names that exceed single page length

RULE #2 Name Consolidation for names that exceed single page length (continued)

Adjusted presentation Screen 1
Haans - Higbert
1. Haans     N
2. Hand     O
3. Hegger     P
4. Hiawatha     Q
5. Higbert     R
6.
7.
8.
9.
10.

406

Adjusted presentation Screen 2
Hubbard
A - J
1. Hubbard     A
2. Hubbard     B
3. Hubbard     C
4. Hubbard     D
5. Hubbard     E
6. Hubbard     F
7. Hubbard     G
8. Hubbard     H
9. Hubbard     I
10. Hubbard     J

412

Adjusted presentation Screen 3
Hubbard
K - M
1. Hubbard     K
2. Hubbard     L
3. Hubbard     M
4.
5.
6.
7.
8.
9.
10.

Unadjusted presentation Screen 4
Huarta - Huuts
1. Huarta     Q
2. Huatra     W
3. Huuts     E
4.
5.
6.
7.
8.
9.
10.

FIG. 4B

METHODS AND INTERFACES FOR TELEPHONE BOOK INDEXING

FIELD

The present disclosure relates to telephone books in mobile communication devices, and more particularly to methods and devices to provide access to telephone book entries in a mobile communication device.

BACKGROUND

Mobile communication devices are becoming an integral part of users' business and personal lives. As memory capacity improves, a mobile communication device can be configured to include a contact datum in the form of a telephone book of nearly any size. A telephone book may therefore contain hundreds or more entries. A telephone book may also contain many entries of the same name, particularly where a certain name is a common name.

For some users, their telephone book stored in the memory of a mobile communication device may contain so many entries that accessing an entry of the telephone book may prove to be cumbersome. For example, to access an entry a user can scroll through the list of entries on the display screen of the mobile communication device. To scroll through the list, the user can start at the first entry to find the sought entry. However, when there are hundreds of entries, scrolling through so many entries may be time consuming.

Methods for reducing the amount of time to find an entry may include text searching methods. However, in a text searching method, a user must enter the text for searching via the keypad to initiate the text search. As with scrolling, entering the text of an entry into the keypad of the device may be time consuming.

Particularly for telephone books with many entries, it would be beneficial to minimize user actions required to achieve a desired record selection. It would further be beneficial to reduce the amount of time for a user to access a particular entry. It would be beneficial, especially for telephone books having many similar entries, if the entries were available with easy access.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 4A-B illustrate the situation where the retrieved list of conforming names includes entries of the same name so that the entries of the same name fills at least one page length of the display.

Figure 1:
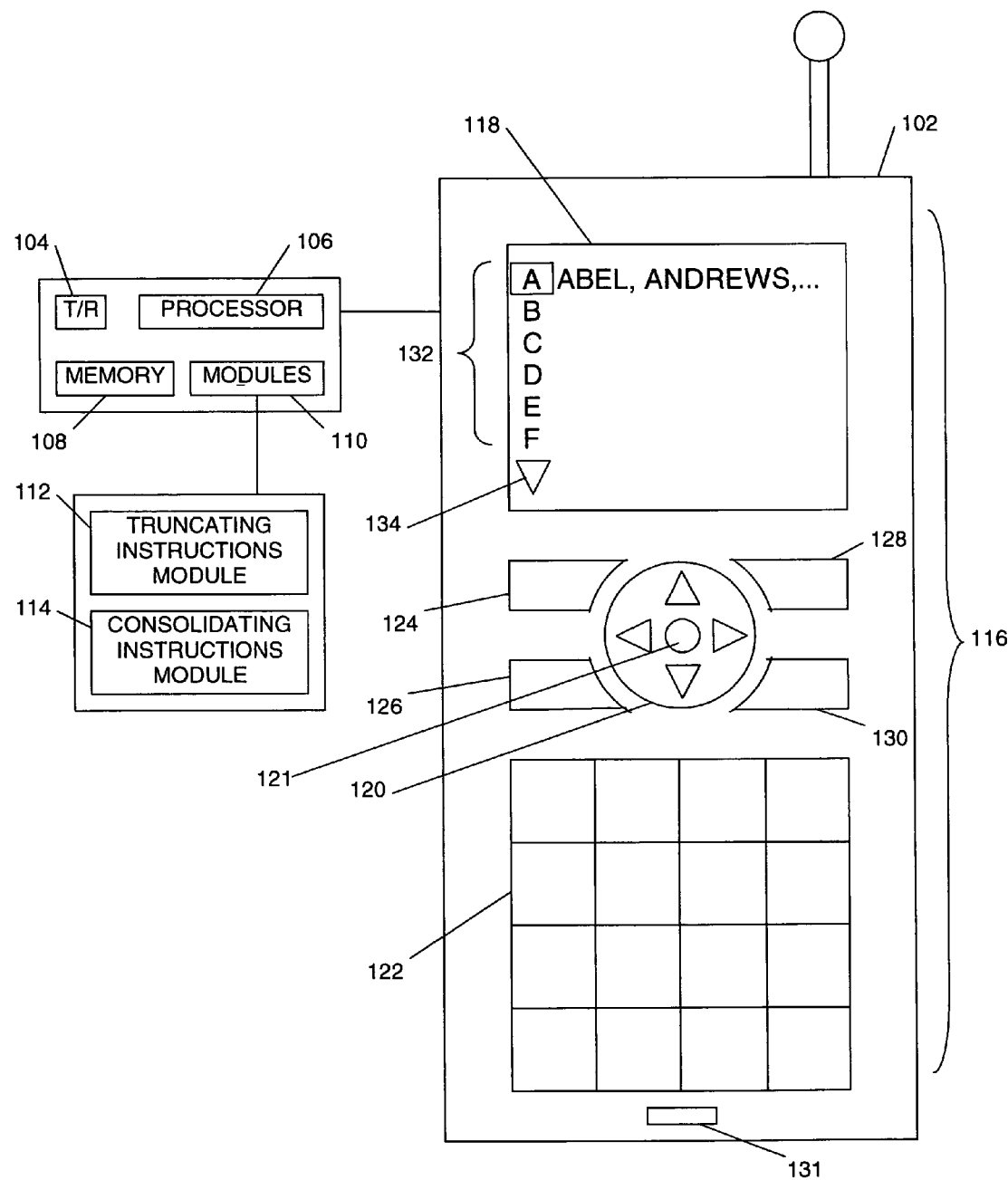
FIG. 1 depicts a mobile communication device including a user interface.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Disclosed are methods and telephone book interfaces for a navigable telephone book of a mobile communication device. The telephone book entries can include a subset of the telephone book entries that are conforming names. The entries are stored in the memory of the device for access by a presentation algorithm of the user interface. Instructions can be received by the mobile communication device via the user interface to select a starting letter of a name from the telephone book entries. According to the presentation algorithm, the starting letters can be arranged on the display screen so that at least one letter can be selected by coarse scrolling control. A retrieved list of conforming names corresponding to the selected starting letter can be arranged so that they may be accessed by fine scrolling control.

Also disclosed is retrieving a list of conforming names and displaying conforming names as a truncated list and a consolidated list. A truncated list of conforming names can be displayed on the display screen so that a plurality of telephone book entries of the same name are undivided on a display screen, if the retrieved list of conforming names would otherwise span more than one page length of the display. On the other hand, names are consolidated on the display screen if the consolidated list of conforming names fills at least one page length of the display.

A telephone book interface for a mobile communication device includes a display screen for displaying names associated with telephone book entries. The interface also includes a truncating instructions module configured for displaying on the display screen a truncated list of conforming names so that a plurality of telephone book entries of a same name are undivided on a display screen. The interface further includes a consolidating instructions module configured for displaying on the display screen a list of conforming names so that a plurality of telephone book entries of the same name are consolidated on at least one display screen. Other modules can be included in the interface without exceeding the scope of this disclosure. The interface can include at least one directional key to select a starting letter of a name from starting letters of names of the telephone book entries and at least one directional key of the user input device to select a name from names of the telephone book entries.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

FIG. 1 depicts a mobile communication device including a user interface. The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The mobile communication device 102 can include a transceiver 104, a processor or controller 106, memory 108, and modules 110. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below. The modules can include a truncating instructions module 112 and a consolidating instructions module 114.

The user interface 116 of the mobile communication device can include a display screen 118, a directional navigation key 120 with selection button 121, a keypad 122, and function keys 124, 126, 128, and 130. It is understood that other user input devices such as audio input 131 may be included in the user interface. The navigational key 120 may be comprised of a single toggle or joystick type button or the navigational key 120 may be made up of a plurality of buttons.

On the display screen 118 is shown letters of the alphabet, A-F 132 and a downward arrow 134. The box drawn around the letter "A" is to indicate that "A" is selected by a highlight. Next to letter "A" are two names separated by a comma, "Abel, Andrews, . . . " to indicate names starting with the letter "A" in the telephone book stored in memory 108 of the mobile communication device 102. Accordingly, in one embodiment, starting letter selection of the name may be made by coarse control utilizing the directional navigation key 120 in the vertical direction and name selection may be made by fine control utilizing the directional navigation key 120 in the horizontal direction. Selection of a starting letter or entry can be made with selection button 121 or another method such as audio input.

Figure 2:
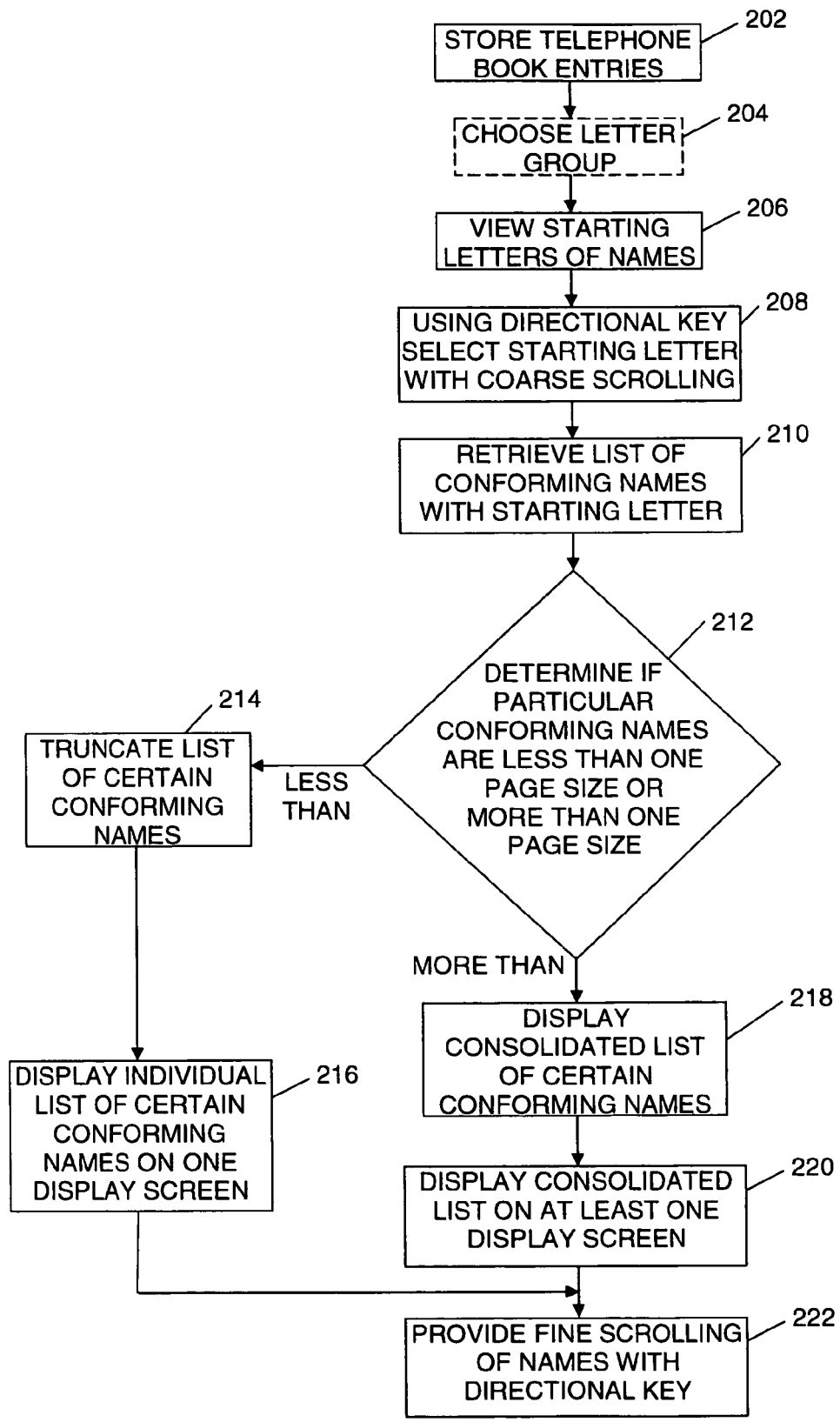
FIG. 2 is a flow chart of an embodiment of a method.

FIG. 2 is a flow chart of an embodiment of the method for a navigable telephone book. Telephone book entries are stored 202 in a telephone book stored in the memory 108 of the mobile communication device 102 for access by a presentation algorithm of the user interface. The navigational and arrangement processes provided by the presentation algorithm are dynamic since the content of the telephone book and user preferences can change. In particular, telephone book entries can be added, deleted and edited. The navigational processes can allow first coarse control selection of a letter group and/or a starting letter of a name from a list of presented letters. After a starting letter has been selected, the navigational processes can also allow fine control selection of a list of names. The presentation algorithm can further dynamically arrange the names for scrolling in different manners depending upon the number of same names that are retrieved in the list of conforming names. Conforming names can include at least one of name starting with the same letter, the same letter sequence, names spelled identically and names spelled similarly. Accordingly, the methods and interfaces described may minimize user actions required to achieve a desired record selection and may reduce the amount of time for a user to access a particular entry.

In selecting a starting letter, the mobile communication device 102 via the interface 116 in one embodiment can receive instructions to choose a letter group. For example, certain keys on the keypad include letters in groups. For example the number "2" includes letter group "ABC," and the number "3" includes letter group "DEF," and so on. The keypad 122 of the user interface, for example, may be used to select a letter group. Accordingly, a user may choose a letter group 204. Additionally, or alternatively in another embodiment, the user may view the starting letters of names on the display screen 206, for example, vertically and sequentially so that they may be scrolled through. Alternatively, the starting letters may be arranged on the display screen as file tabs or floaters. In one embodiment, the starting letters displayed may include only those letters that are starting letters of names stored in the telephone book. For example, a telephone book entry may contain no names starting with "E." In that case the display screen 118 showing letters "A, B, C, D, E and F" 132 would instead show "A, B, C, D, F and G." Alternatively, if a starting letter is not represented in the telephone book entries it may be grayed or otherwise indicated as not relevant.

The manner in which the starting letters are arranged may be determined by user preference. For example, in another embodiment, middle character selection may be the default display. For example, the three letters "ABC" may be represented by the letter "B." Navigating right or pressing the select key 121 may provide a letter selection. Navigating up from the display selection may automatically return the navigation to character selection mode. It is understood that any arrangement of letters for coarse scrolling control is within the scope of this discussion.

The method can further include arranging on the display screen 118 conforming names once the stating letter has been selected 210. As previously discussed, using a directional key 120 a starting letter of a name from the telephone book entries can be selected 208 with coarse scrolling. Then once a letter is selected, a list of conforming names may be provided for selection with fine scrolling. For example, navigation button 120 may provide navigation first vertically in coarse control for letter selection, and then horizontally in fine control. As previously discussed, conforming names can include at least one of name starting with the same letter, the same letter sequence, names spelled identically and names spelled similarly.

Once conforming names are retrieved after letter selection, the presentation algorithm may determine the manner in which the names are arranged. In the situation where the starting letters are displayed horizontally, for example as tabs or any other arrangement, the navigation buttons 120's horizontal control may be used to select a letter. The names may then be displayed vertically. The arrangement of the names can depend upon whether particular conforming names would occupy less than a page length or whether more than a page length when listed 212 on a page of the display screen 118. If the retrieved list of conforming names includes the same name, and the entries having the same name could be listed on one page, and the retrieved list of conforming names would otherwise span more than one page length of the display, then the list can be truncated so that the entries having the same name can be listed on one page 214. An undivided list of certain conforming names is displayed on one display screen 216. On the other hand, the retrieved list of conforming names can include enough same names so that the same name fills at least one page length of the display 218. Accordingly, a consolidated list of certain conforming names is displayed 220. In either case, the names are displayed and can be available for fine scrolling control through the retrieve list of names 222.

Figure 3:
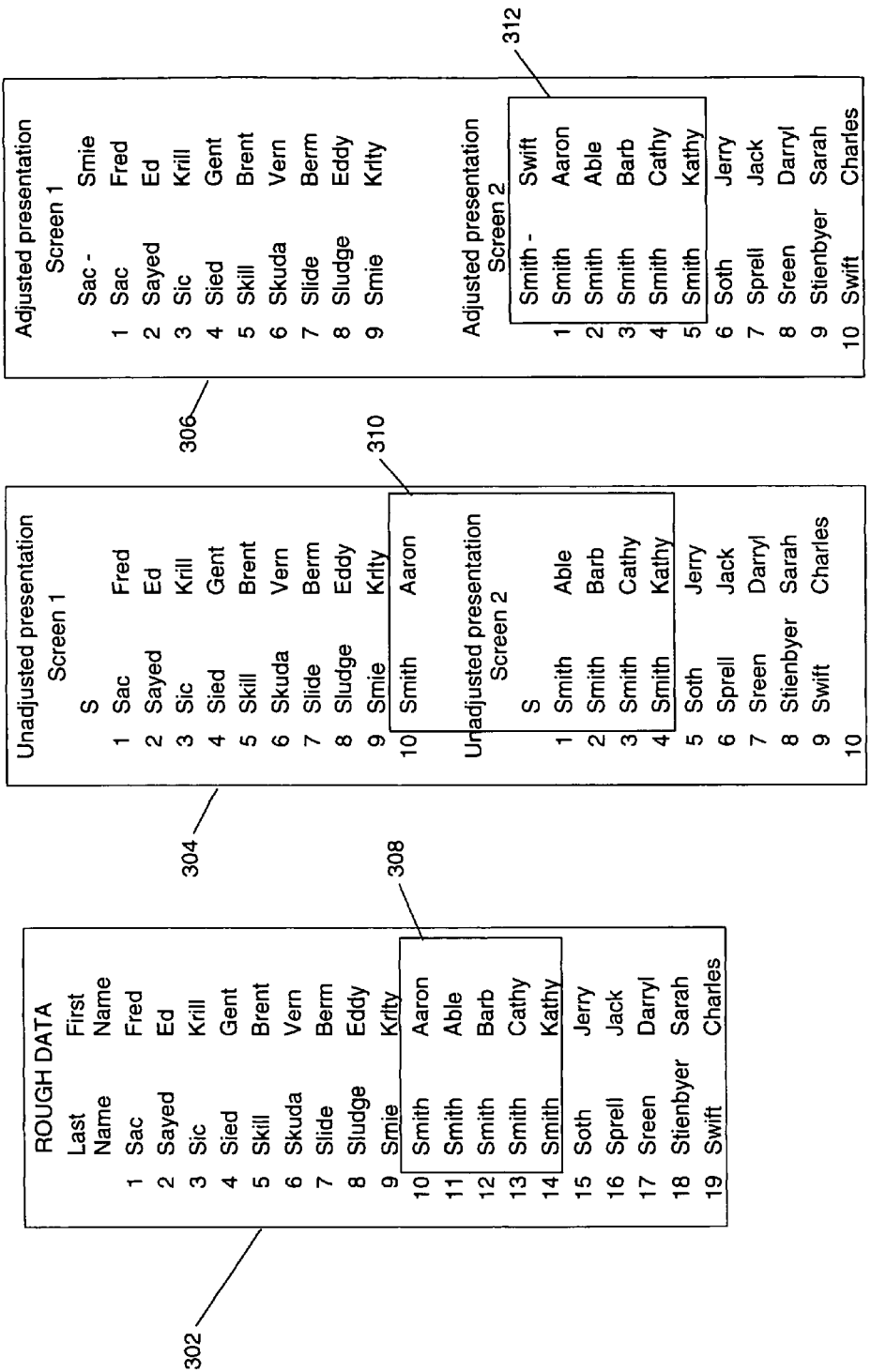
FIG. 3 illustrates the situation where the retrieved list of conforming names includes entries of the same name that would otherwise span more than one page length of the display.
Figure 4A:
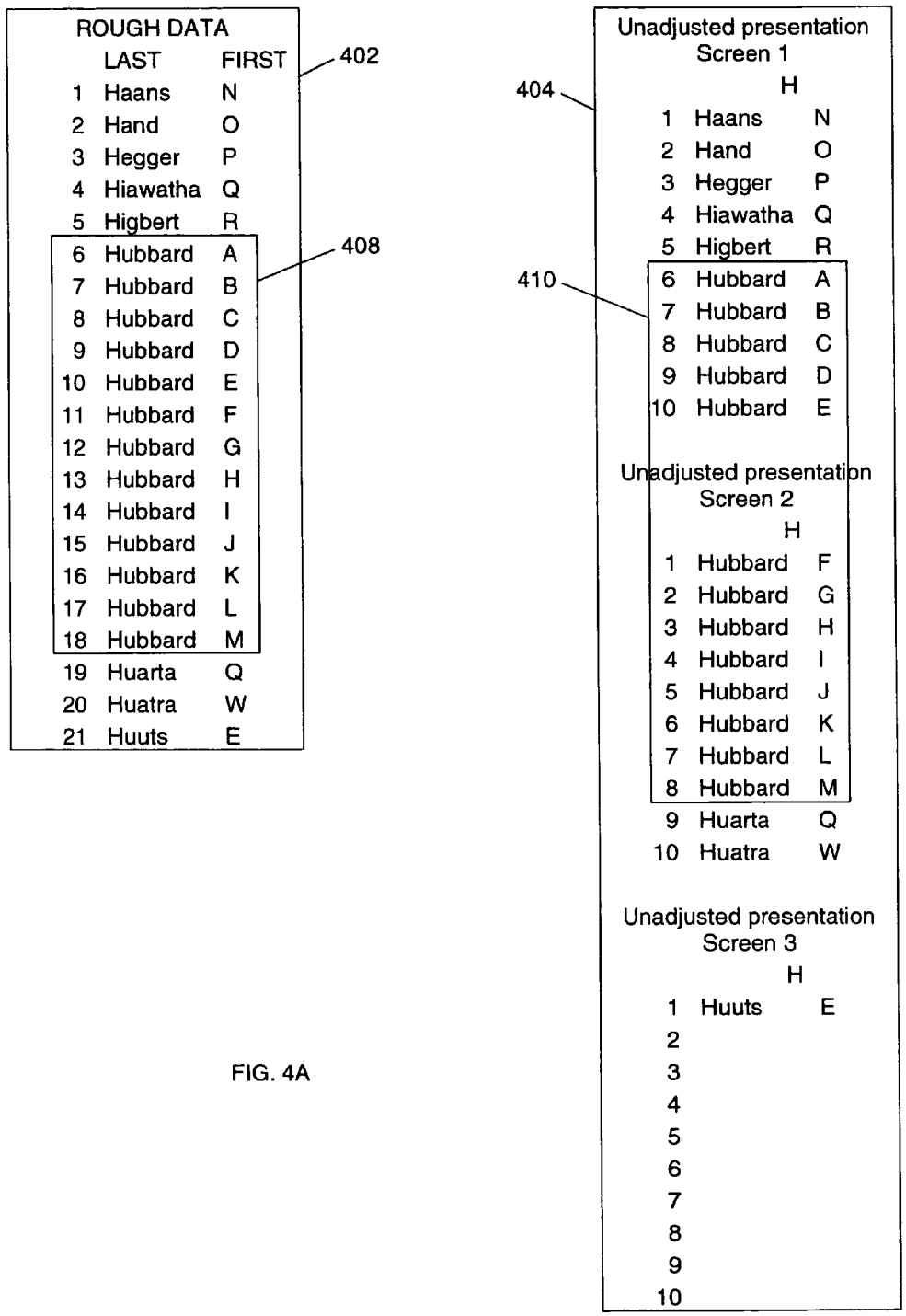

FIG. 3 illustrates the situation where the retrieved list of conforming names includes the entries of the same name that would otherwise span more than one page length of the display, the list is truncated so that the entries having the same name can be listed on one page. FIGS. 4A-B illustrate the situation where the retrieved list of conforming names includes entries of the same name so that the entries of the same name fill at least one page length of the display. FIGS. 3 and 4A-B will be described in more detail.

Referring to FIG. 3, stored in memory may be a telephone book including entries, a subset of which can be conforming names. As mentioned above, conforming names can include at least one of names starting with the same letter, the same letter sequence, names spelled identically and names spelled similarly. Conforming names may be defined in other ways considering languages other than the English language and alphabets other than the English alphabet. It is understood that conforming names can be defined in any manner.

FIG. 3 includes three parts: rough data 302, unadjusted data 304, and data adjusted by the presentation algorithm 306. The rough data 302 shows names from telephone book entries that may have been entered into the memory of the mobile communication device by the user, or in any other manner, such as by download from another source. The rough data includes nineteen names starting with the letter "S." The rough data can be of any amount. Instead of listing names starting with the same letter, the names may be listed to include names from a letter group, "PQRS," for example. There may be fewer names in the rough data or more names in the rough data. In the rough data, five "Smith" names are enclosed 308.

In the event that the display screen is configured to display ten names per page, the nineteen entries that are not adjusted by the described presentation algorithm may be shown on two separate screens, Screen 1 and Screen 2 shown together 304. The five "Smith" names 310 are shown in the screens without presentation adjustment as spanning more than one page length of the display. The name "Smith, Aaron" is shown on Screen 1, while the other four "Smith" names are shown on Screen 2.

Upon adjustment by the presentation algorithm, the list prior to the names "Smith" is truncated so that the entries of the telephone book denoted by the same name "Smith" may appear undivided on a page 306. On Screen 2, the five "Smith" names are shown together 312. In this manner, the presentation algorithm including truncation instruction module (112, FIG. 1) provides displaying on the screen a truncated list of conforming names so that a plurality of telephone book entries of the same name are undivided on a display screen when the retrieved list of conforming names includes the plurality of telephone book entries of the same name so that the plurality of telephone book entries with the same name would otherwise span more than one page length of the display.

FIGS. 4A-B also includes three parts. Two parts are shown in FIG. 4A, and one part is shown in FIG. 4B. Rough data 402, unadjusted data 404 and data adjusted by the presentation algorithm 406. The rough data 402 includes twenty-one names starting with the letter "H." As mentioned above, the rough data can be of any amount. In this case, there are twenty-one names starting with the letter "H" and thirteen "Hubbard" names 408.

In the event that the display screen is configured to display ten names per page, the twenty-one entries that are not adjusted by the described presentation algorithm may be shown on three separate screens, Screen 1, Screen 2 and Screen 3 shown together 404. The thirteen "Hubbard" names 410 are shown in the screens without presentation adjustment as spanning more than one page length of the display. Since there are thirteen names, and the page length in this example is ten lines, the retrieved list of conforming names fills at least one page length of the display.

Upon adjustment by the presentation algorithm, the list of the same name is consolidated to one or more page lengths 412. On Screen 2, the ten "Hubbard" names are shown together and on Screen 3, the remaining three "Hubbard" names are shown together. In this manner, the presentation algorithm including consolidation instruction module (114, FIG. 1) provides displaying on the screen a list of conforming names so that a plurality of telephone book entries of the same name are so that they are consolidated on at least one display screen, when the retrieved list of conforming names includes the plurality of telephone book entries of the same name so that the plurality of telephone book entries of the same name fills at least one page length of the display.

In an alternative embodiment to that shown 412, Screen 4 can be combined with Screen 3. Also shown are the initials of first names. In other circumstances, the full name, instead of initial, would be shown. In the FIG. 4B, initials are used for clarity. In the event that there are two or more "Hubbard" names with the same first initial, a full name can be shown. In the event that there are two or more "Hubbard" names with the same full name, additional information distinguishing the entries can be provided. In this manner, the presentation algorithm may provide easy access to entries in the telephone book.

As mentioned above, the presentation algorithm for navigable arrangement of letters and names is dynamic since user preferences may change and the data of the telephone book can change with new entries and deletions. It is understood that different manners in which to carry out the presentation algorithm are within the scope of this discussion.

As mentioned above, the starting letters may be arranged on the display screen as file tabs or floaters. That is, the tabbed selections may instead be shown as floaters. For example, for the letter "L," floaters may include "Lia-Lea," "Lee," "Loe-Lurs," and "Lof-Lurs." By selecting a floater, the selection may open a page that may not be greater than ten entries, were ten entries the amount to fill a page length of the display screen. When opening a floater of the same name, for example, "Lee," another set of floaters may be displayed on the display screen to indicate first initials, the first letters of first names or the entire first names. For example, were there ten "Lee" names in the telephone book, there may be two sets of first name indicia such as "Allen-Jack" and "Kevin-Steve." The presentation arrangement of floaters is the same as described above with respect to truncation and consolidation processes as discussed above. As with the truncation discussed above, duplicate names over ten in number may not be overlapped or spanning adjacent floaters before or after. Additionally, as with consolidation discussed above, duplicate names may be undivided on a page. If there are enough names to fill a page, a page of the same name (such as "Lee" shown above) will be included in a floater.

Figure 5:
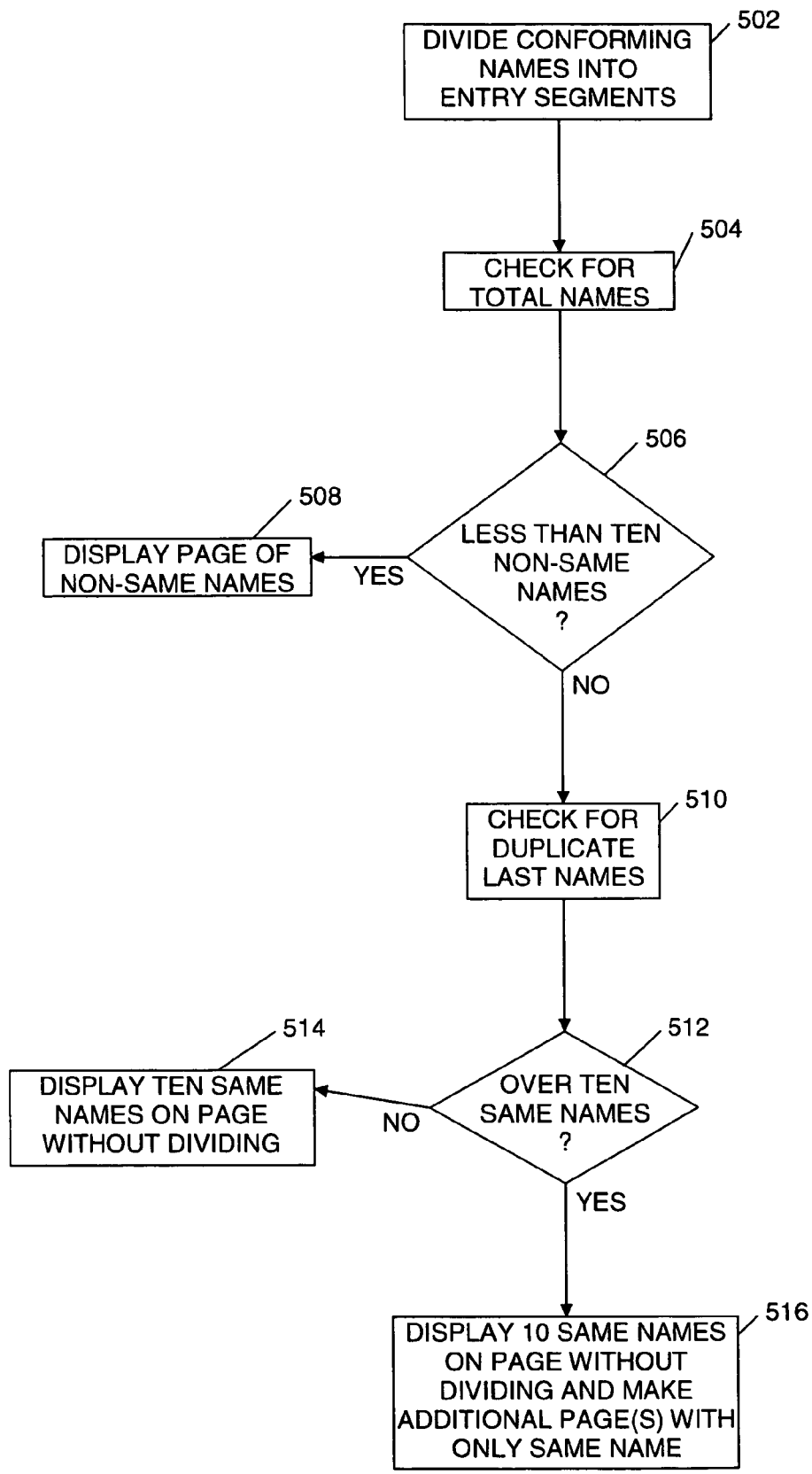
FIG. 5 is a flow chart of an embodiment of the presentation algorithm.

FIG. 5 is a flow chart of an embodiment of the presentation algorithm. Depending upon the screen size allowing, for example, a particular number of entries listed, tabbed or with floaters, the methods can include different processes so that duplicate last names may not span multiple pages unless there will be a full screen or screens set up that display entries associated with that last name.

After a starting letter or letters has been selected, the method includes dividing conforming names into telephone book entry segments 502. On the first pass the method includes counting where the ten items per screen separation would be for a page length of ten items. That is, the total number of names with the same starting letter can be evaluated for items per page 504. A determination as to whether there are ten or fewer non-same names is made 506. If there are ten or fewer non-same names, then they are displayed 508. In the second pass the method counts the number of same last names that exceed the size of single page 510.

The third pass determines if the same names would span screens. The process may ignore items that span screens based on the second pass results. The method further provides a determination as to whether there are over ten entries of the same name 512. If there are fewer than ten entries of the same name, they can be displayed on the same page without dividing the entries 514. If there are more than ten entries of the same name, then one or more additional pages can be made to include the remaining same name entries 516.

The navigational and arrangement processes provided by the presentation algorithm are dynamic since the content of the telephone book and user preferences can change. The navigational processes can allow first coarse control selection of a letter group and/or a starting letter of a name from a list of presented letters. After a starting letter has been selected, the navigational processes can also allow fine control selection of a list of names. The presentation algorithm can further arrange the names for scrolling in different manners depending upon the number of same names that are retrieved in the list of conforming names and the capacity of the display screen. Accordingly, the methods and interfaces described may minimize user actions required to achieve a desired record selection and may reduce the amount of time for a user to access a particular entry. In particular for telephone books having many entries, the described methods and interfaces may make the telephone book entries available with easy access.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A method for a navigable telephone book of a mobile communication device wherein telephone book entries are stored in a memory of the mobile communication device, the method comprising:

retrieving a subset of the telephone book entries that is a list of conforming names;

displaying on a display screen of the mobile communication device a truncated list of conforming names so that a plurality of telephone book entries of the same name are undivided on a display screen, if the retrieved list of conforming names includes the plurality of telephone book entries of the same name so that the plurality of telephone book entries with the same name would otherwise span more than one page length of the display; and displaying on the display screen a list of conforming names so that a plurality of telephone book entries of the same name are consolidated on at least one display screen, if the retrieved list of conforming names includes the plurality of telephone book entries of the same name so that the plurality of telephone book entries of the same name fills at least one page length of the display.

2. The method of claim 1, wherein conforming names comprises:

at least one of names starting with the same letter, the same letter sequence, names spelled identically and names spelled similarly.

3. The method of claim 1 wherein the mobile communication device comprises a keypad having alphanumeric characters, wherein retrieving comprises:

receiving instructions via the keypad to select a starting letter of a name from starting letters of names of the telephone book entries.

4. The method of claim 1 wherein the mobile communication device comprises a user input device, wherein retrieving comprises:

receiving instructions via at least one directional key of the user input device to select a starting letter of a name from starting letters of names of the telephone book entries.

5. The method of claim 1 wherein the mobile communication device comprises a user input device, wherein retrieving comprises:

receiving instructions via at least one directional key of the user input device to select a name from the list of conforming names of the telephone book entries.

6. A method of a mobile communication device having a user interface comprising a display screen, the method for a navigable telephone book having a plurality of telephone book entries comprising conforming names, the method comprising:

storing the telephone book entries of the navigable telephone book for access by a presentation algorithm for the user interface;

receiving instructions via the user interface to select a starting letter of a name from the telephone book entries; and arranging on the display screen, according to the presentation algorithm, the plurality of telephone book entries comprising conforming names to form a retrieved list of conforming names so that the plurality may be accessed by at least one of a fine scrolling control and a coarse scrolling control, the conforming names include: at least one of names starting with the same letter, the same letter sequence, names spelled identically and names spelled similarly.

7. The method of claim 6 wherein the user interface comprises a user input device, the method further comprising:

receiving instructions for fine scrolling via at least one direction key of the user input device to select a name from names of the navigable telephone book.

8. The method of claim 6 wherein the user interface comprises a user input device, the method further comprising:

receiving instructions for coarse scrolling via at least one directional key of the user input device to select a starting letter of a name from starting letters of names of the telephone book entries.

9. The method of claim 6 wherein the user interface comprises a keypad having alphanumeric characters, the method further comprising;

receiving instructions via the keypad to select a starting letter of a name from starting letters of names of the telephone book entries.

10. The method of claim 6, wherein the fine scrolling control comprises:

displaying on the screen a truncated list of conforming names so that a plurality of telephone book entries of a same name are undivided on a display screen, if the retrieved list of conforming names includes the plurality of telephone book entries of the same name so that the plurality of telephone book entries with the same name would otherwise span more than one page length of the display.

11. The method of claim 6, wherein the fine scrolling control comprises:

displaying on the screen a list of conforming names so that a plurality of telephone book entries of a same name are consolidated on at least one display screen, if the retrieved list of conforming names includes the plurality of telephone book entries of the same name so that the plurality of telephone book entries of the same name fills at least one page length of the display.

12. A telephone book interface for a mobile communication device, the telephone book interface comprising:

a display screen for displaying names associated with telephone book entries, a subset of telephone book entries comprising conforming names;

a truncating instructions module configured for displaying on the display screen a truncated list of conforming names so that a plurality of conforming names of a same name are undivided on a display screen, if a retrieved list of conforming names includes the plurality of telephone book entries of the same name so that the plurality of telephone book entries with the same name would otherwise span more than one page length of the display screen; and a consolidating instructions module configured for displaying on the display screen a list of conforming names so that a plurality of conforming names of the same name are consolidated on at least one display screen, if the retrieved list of conforming names includes the plurality of telephone book entries of the same name so that the plurality of telephone book entries of the same name fills at least one page length of the display screen.

13. The interface of claim 12, wherein conforming names comprises:

at least one of names starting with the same letter, the same letter sequence, names spelled identically and names spelled similarly.

14. The telephone book interface of claim 12, further comprising:

a user input device configured to provide directional input adapted to select a starting letter of a name from starting letters of names of the telephone book entries.

15. The telephone book interface of claim 12, further comprising:

a user input device configured to provide directional input adapted to select a name from the telephone book entries.

16. The interface of claim 12, further comprising directional input for scrolling through the retrieved list of conforming names on the display screen.

17. The interface of claim 12, further comprising horizontal input for scrolling through starting letters on the display screen.

18. The interface of claim 12, further comprising:

a keypad input device to select a starting letter of a name from starting letters of names of the telephone book entries.

19. The interface of claim 12, further comprising:

an audio input device to select at least one of a starting letter of a name from the telephone book entries and a name from the telephone book entries.

* * * * *